United States Patent
Badana et al.

(10) Patent No.: US 11,347,449 B1
(45) Date of Patent: May 31, 2022

(54) METHODS AND SYSTEMS FOR HANDLING ONE OR MORE REQUESTS RECEIVED IN A REMOTE WORKING ENVIRONMENT

(71) Applicant: XEROX CORPORATION, Norwalk, CT (US)

(72) Inventors: Shanmukha Teja Badana, Amadalavalasa (IN); Pedireddy Devi, Kirlampudi (IN); Harish Tirumalasetty, Guntur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/200,314

(22) Filed: Mar. 12, 2021

(51) Int. Cl.
*G06F 3/12* (2006.01)

(52) U.S. Cl.
CPC .......... *G06F 3/1222* (2013.01); *G06F 3/1238* (2013.01); *G06F 3/1253* (2013.01); *G06F 3/1285* (2013.01)

(58) Field of Classification Search
None
See application file for complete search history.

(56) References Cited

U.S. PATENT DOCUMENTS

| 2012/0075485 A1* | 3/2012 | Mizutani | H04M 1/72412 348/207.1 |
| 2017/0060503 A1* | 3/2017 | Tomihisa | H04W 4/80 |

* cited by examiner

*Primary Examiner* — Thomas D Lee

(57) ABSTRACT

The present disclosure discloses methods and systems for handling one or more requests received in a remote working environment. The method includes receiving at least one request: including a print request and a request to turn-off a multi-function device, the request is received from a computing device of a user. Based on the request, it is checked whether the computing device is remotely located by obtaining a location of the computing device using a pre-defined method in real-time such as GPS. Then, the obtained location of the computing device is compared with a location of the multi-function device. Based on the comparison, a corresponding message or an alert is presented to the user via a user interface, for an appropriate action. The user may submit the document as a secure print job. The user may check other non-remote users and may not turn-off the multi-function device when working remotely.

20 Claims, 12 Drawing Sheets

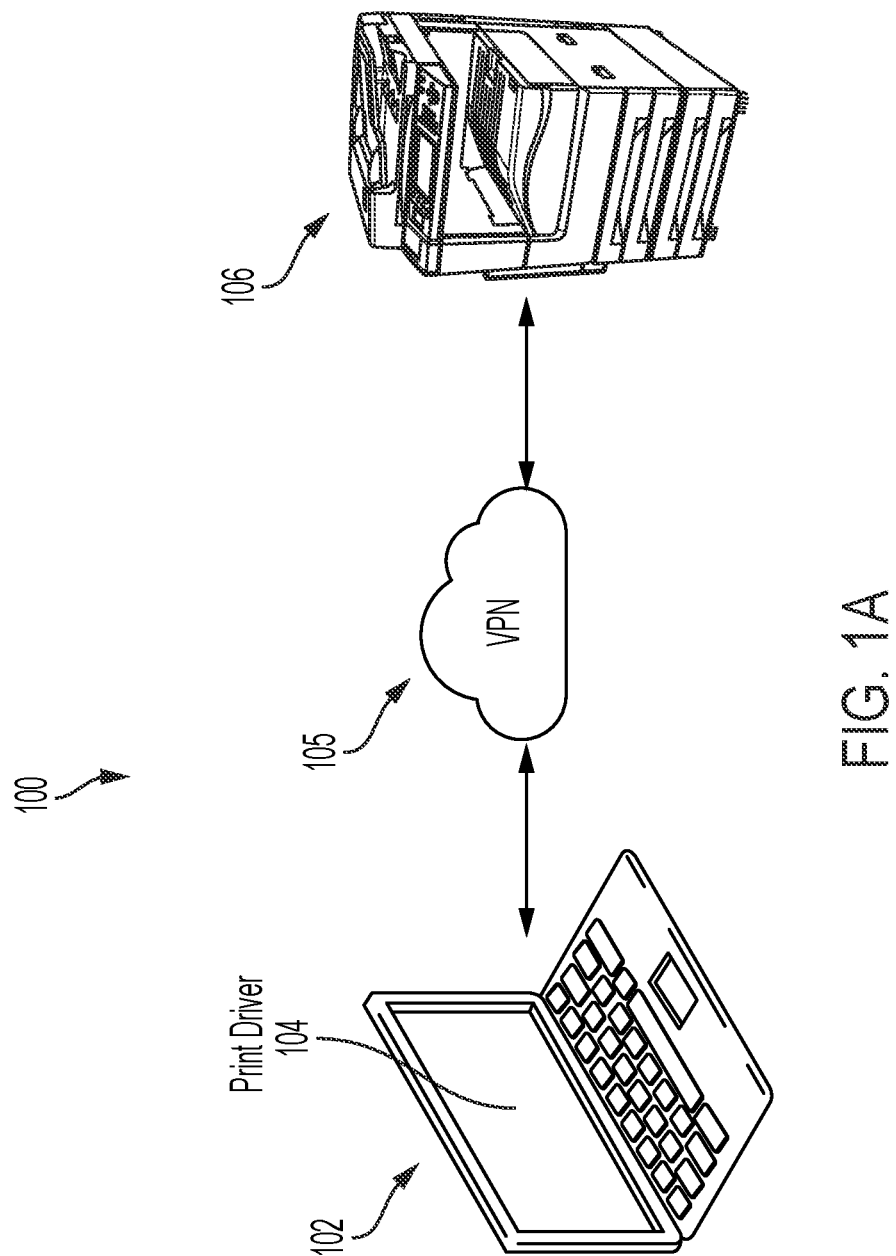

METHODS AND SYSTEMS FOR HANDLING ONE OR MORE REQUESTS RECEIVED IN A REMOTE WORKING ENVIRONMENT

TECHNICAL FIELD

The present disclosure relates to the area of printing. More specifically, the disclosure relates to methods and systems for handling one or more requests received in a remote working environment.

BACKGROUND

In offices, typically user devices such as computing devices, laptops, etc. are connected to each other and various other office devices such as printers, multi-function devices etc., via a local area network (LAN) that may be wired or wireless. The users submit various requests such as print request to the connected printers or multi-function devices through the LAN. But lately, work operation mode is totally shifted where users are working/operating from home instead of office location. For example, users may work from home or may operate from a different location of their own choices. In such remote working environment, users/user devices are connected to each other via a Virtual Private Network (VPN). VPN allows the users located at remote locations to securely connect to office network using public network (i.e., the Internet). Similar to the LAN, the users can access all office devices, communicate with each other, and can submit print requests through a remote location once connected to the VPN. Similar to all users, admin users can remotely access and control office devices such as printers, multi-function devices or the like through the VPN connection. For example, an admin user can see all print jobs present in a job queue, manage jobs, turn-on, or turn-off any device.

The user connected to the VPN can select a printer through his computing device and submits a document for normal printing. The printer prints the document based on user's submitted attributes. But this approach may pose serious security issues. For example, the printed document can be accessed by anyone present in the office as the user who submitted the print request is not in office. Further, even if the user's location is nearby, the user may take time to reach office and collect the printed documents, meanwhile any other user can collect the document. Implementing this approach allows others/unauthorized users to have access to potentially confidential and/or personal information of the user. Similarly, when the admin user turns-off any office device remotely by accident or knowingly, it may create a problem for other users who are working from office. For example, users present in the office may want to print documents or access device for other purposes such as scanning, copying or the like, but are not able to perform any action as it is turned-off by the admin user. Currently, there are no solutions or mechanism known to handle such requests that are submitted from users through remote locations/located remotely. Therefore, there is a need for methods and systems to address such challenges.

SUMMARY

According to aspects illustrated herein, there is a method for securing a remote print job, where the method is implemented at a print driver running on a computing device. The method includes receiving a print command request for printing a document from a user through the print driver along with one or more print attributes. Before submitting the document for printing to the multi-function device, it is checked whether the computing device is located remotely to the multi-function device. Based on the check, a message is generated and displayed to the user in real-time via a user interface, to submit the document as a secure print job.

According to further aspects illustrated herein, a computing device for securing a remote print job is disclosed. The computing device includes a print driver for receiving a print request for printing a document through the print driver along with one or more print attributes, wherein at least one print attribute selected for printing the document is a normal print job; before submitting the document for printing to the multi-function device, checking whether the computing device is remotely connected to the multi-function device; and based on the check, generating and displaying a message to alert the user in real-time via a user interface, to submit the document as a secure print job.

According to furthermore aspects illustrated herein, there is a method for managing one or more multi-function devices from a remote location. A remote printer access app runs on a computing device of an admin user for: providing a user interface to the admin user for managing and accessing the one or more multi-function devices and one or more print jobs from a remote location, wherein the one or more multi-function devices are communicatively coupled to each other via a network; receiving a request to turn-off at least one multi-function device of the one or more multi-function devices connected in the network; based on the request, checking whether the computing device is remotely located to the multi-function device by obtaining a location of the computing device using a pre-defined method in real-time; comparing the obtained location of the computing device with a location of the at least one multi-function device; and based on the comparison, presenting a warning message to the admin user via the user interface to not turn-off the at least one multi-function device.

According to furthermore aspects illustrated herein, a computing device for managing one or more multi-function devices from a remote location is disclosed. The computing device includes a remote printer access app running on the computing device of an admin user for: providing a user interface to the admin user for managing and accessing one or more multi-function devices and one or more print jobs from a remote location, wherein the one or more multi-function devices are communicatively coupled to each other via a network; receiving a request to turn-off at least one multi-function device of the one or more multi-function devices; based on the request, obtaining a location of the computing device of the admin user using a pre-defined method in real-time; comparing the obtained location of the computing device with a location of the at least one multi-function device; and based on the comparison, presenting a warning message to the admin user via the user interface to not turn-off the at least one multi-function device.

According to furthermore aspects illustrated herein, methods and systems for controlling one or more requests received in a remote working environment are disclosed. The method includes receiving at least one request including a print request and a request to turn-off a multi-function device, the request is received from a computing device of a user. Based on the request, it is checked whether the computing device is located remotely by obtaining a location of the computing device using a pre-defined method in real-time such as GPS. Then, the obtained location of the computing device is compared with a location of the multi-function device. Based on the comparison, a corresponding message or an alert is presented to the user via a user interface, for an appropriate action.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 1A and 1B show an exemplary environment in which various embodiments of the present disclosure can be practiced.

DESCRIPTION

Figure 1B:
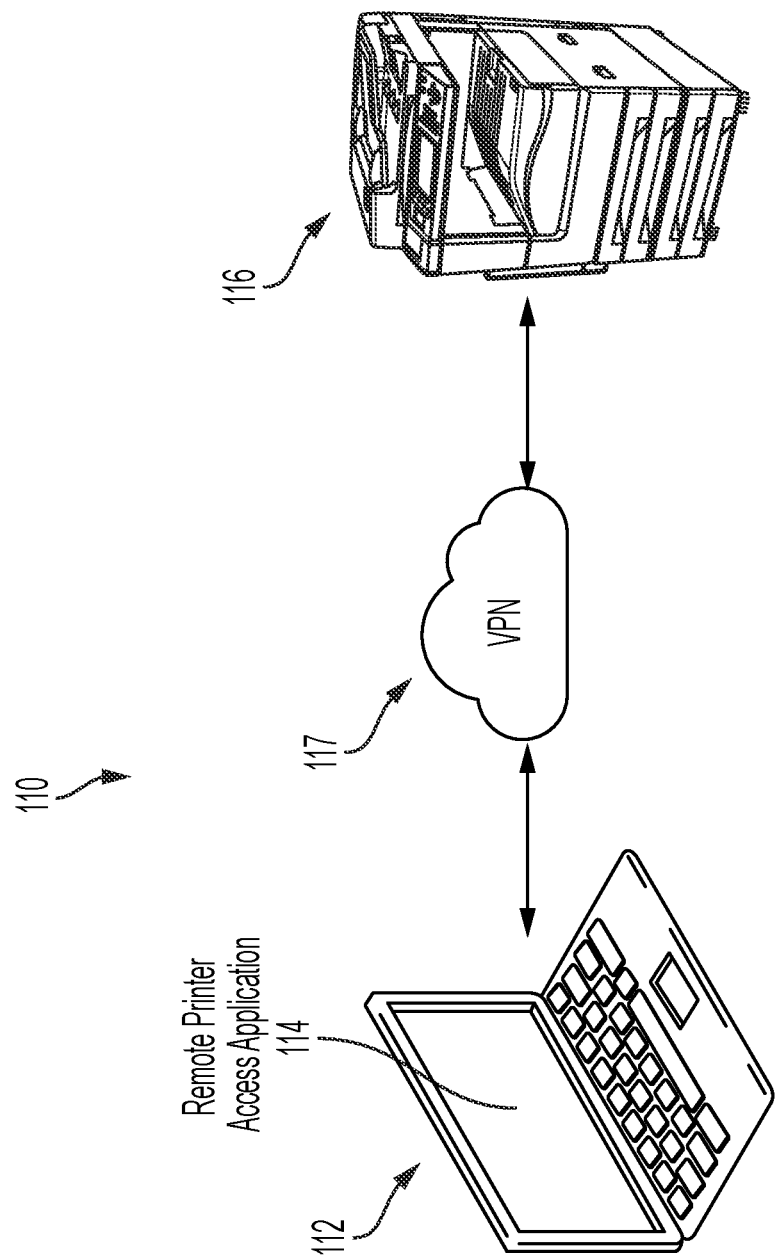

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" refers to a single device or a combination of multiple devices, to perform one or more functions such as, but not limited to, printing, imaging, scanning, copying, imaging, or the like. The multi-function device may include software, hardware, firmware, or a combination thereof. In the context of the current disclosure, the multi-function device is a device located remotely from users or computing devices of the users and is communicatively coupled to the computing devices via Virtual Private Network (VPN). The multi-function device is available to all users for printing via VPN. The multi-function device may send its physical location to other devices such as computing devices and the multi-function device can also be referred to as an office device.

The term "computing device" refers to a device that a user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. The computing device includes one or more applications such as a print driver application, a remote printer access application and so on. The print driver application allows users to submit print commands, one or more print parameters/attributes, and a document for printing. The remote printer access application allows the users such as an admin user to manage the multi-function device or print jobs at the multi-function device remotely. In context of the present disclosure, the computing device handles/controls one or more requests received from one or more users in a remote working environment. Examples of the requests may be at least a print request, a request to turn-off an office device and so on.

The term "user" may include any user such as users who submit print requests or documents for printing from their respective computing devices. The term "admin user" refers to a user who has rights to manage all office devices such as multi-function devices and their functionalities from a remote location. For example, the admin user can turn-on or turn-off the office devices. In another example, the admin user can pause the office devices.

The term "remote working environment" refers to an environment where some users or computing devices are located remotely from the office location or located remotely to the multi-function device. In the remote working environment, the computing devices are connected to each other and/or office devices remotely via VPN. The term "remotely located" is used in context where users and/or their respective computing devices are not present in the office premises and are away from the office location.

The term "pre-defined method" refers to any known or any later developed method for determining location of computing devices and/or users. One exemplary pre-defined method may be Global Positioning System (GPS).

The term "pre-defined value" defines a local area network distance range in which multiple computing devices, office devices, users are typically connected. The pre-defined value may be 10 km, 15 km, 25 km and so on. If any user or computing device is located beyond the pre-defined value, the user/computing device is considered to be remotely located. In other words, any value beyond the pre-defined value indicates the users and/or computing devices are not a part of the local office network and are connected to office network remotely through VPN, for example.

The "pre-defined message" refers to any message shown to the user in the form an alert, a notification, or a warning message. The pre-defined message may relate to the print request. For example, the message for the user may be to change the normal print job to a secure print job. The pre-defined message may relate to turn-off request. For example, the pre-defined message for the user may be to not turn-off an office device such as a multi-function device.

Overview

The present disclosure discloses methods and systems for handling one or more requests received from users in a remote working environment. In one example, the request may be a print request. In another example, the request may be a request to turn-off an office device such as a printer, a multi-function device, a scanner, a copier, or the like. These are two examples, but there may be other type of remote requests from the users. The one or more requests are managed or controlled such that when a user submits a print request including a document for printing from a remote location (also referred to as a remote print job), it is submitted as a secure print job instead of a normal print job. Similarly, when an admin user tries to turn-off an office device such as a printer from a remote location, he is not allowed to turn-off the device. Here, one or more messages are presented to the user and/or admin user in the form of alert, notification, or warnings.

Exemplary Environment

FIG. 1A shows an exemplary environment 100 in which various embodiments of the disclosure can be practiced. The environment 100 represents a remote working environment where multiple users operate remotely and accesses offices devices and/or resources remotely. For simplicity, a single user/computing device is shown but the remote working environment 100 may include multiple users and/or multiple computing devices and so on. In place of the multi-function device 106, the environment 100 may include a printer, a multi-function printer, a multi-function peripheral device or any device with printing capabilities.

As shown, the environment 100 includes a computing device 102 that is communicatively coupled to a multi-function device 106. The computing device 102 is located remotely from the multi-function device 106 and is further connected to the multi-function device 106 through a virtual private network 105 (VPN) in order to securely communicate with other devices and/or users. The VPN 105 creates a secure channel between the computing device 102 and the multi-function device 106 for communication. VPN is one example for connecting the users and/or computing devices to the office network, but the users and/or computing devices may be connected to the office network/devices remotely through other known or later developed ways. A user uses the computing device 102 for his day-to-day tasks such as chatting, emailing, surfing, submitting documents for printing, or the like. Various examples of the computing device 102 may be a laptop, a personal computer, a mobile device, a personal digital assistant or any known or later developed computing device. The computing device 102 runs several applications such as a print driver 104.

The print driver 104 allows a user to submit documents for printing along with one or more print attributes/parameters such as pages, number of copies, black & white, print scale, orientation, destination printer, etc. In the context of the disclosure, the print driver 104 is configured to handle such print requests before submitting to a remote multi-function device 106.

In operation, when the user selects a document for printing via the print driver 104, the print driver 104 receives a document along with other selected print attributes such as a multi-function device such as 106, for printing the document i.e., destination printer, number of copies, number of pages to be printed, orientation, print type or the like. Before submitting the document for printing to the selected multi-function device such as 106, the print driver 104 checks whether the computing device 102 is located remotely from the multi-function device 106 or not. This is determined based on the location of the computing device 102 and the location of the multi-function device 106. Based on the check, the print driver 104 generates a pre-defined message for the user. The pre-defined message alerts the user that the user is submitting the document for printing away from the office location or outside office and further allows the user to take an appropriate action i.e., submit the print job as a secure print job.

Similar to the above, in the environment 110 of FIG. 1B, the computing device 112 and multi-function device 116 are remotely connected through a VPN network 117. The computing device 112 is shown to include a remote printer access application 114. Typically, the remote print application 114 is used by an admin user to remotely manage and access one or more office devices such as multi-function devices, printers, scanners, copiers, or the like. For example, the remote printer access application 114 allows the user to see all print jobs submitted by various users, print queue, and further allows the admin user to turn-on the multi-function device 116, to pause the multi-function device 116, to turn-off the multi-function device 116 connected in the network. In context of the present disclosure, when the admin user requests to turn-off the multi-function device 116 by selecting a turn-off option, the remote printer access application 114 checks whether the admin user and/or his computing device 112 is remotely located. If located remotely from the selected multi-function device 116, the remote printer access application 114 displays a warning message to not turn-off the multi-function device 116. The remote printer access application 114 further disallows the admin user to not turn-off the multi-function device 116 when his computing device 112 is located remotely from the multi-function device 116.

Exemplary System

Figure 2A:
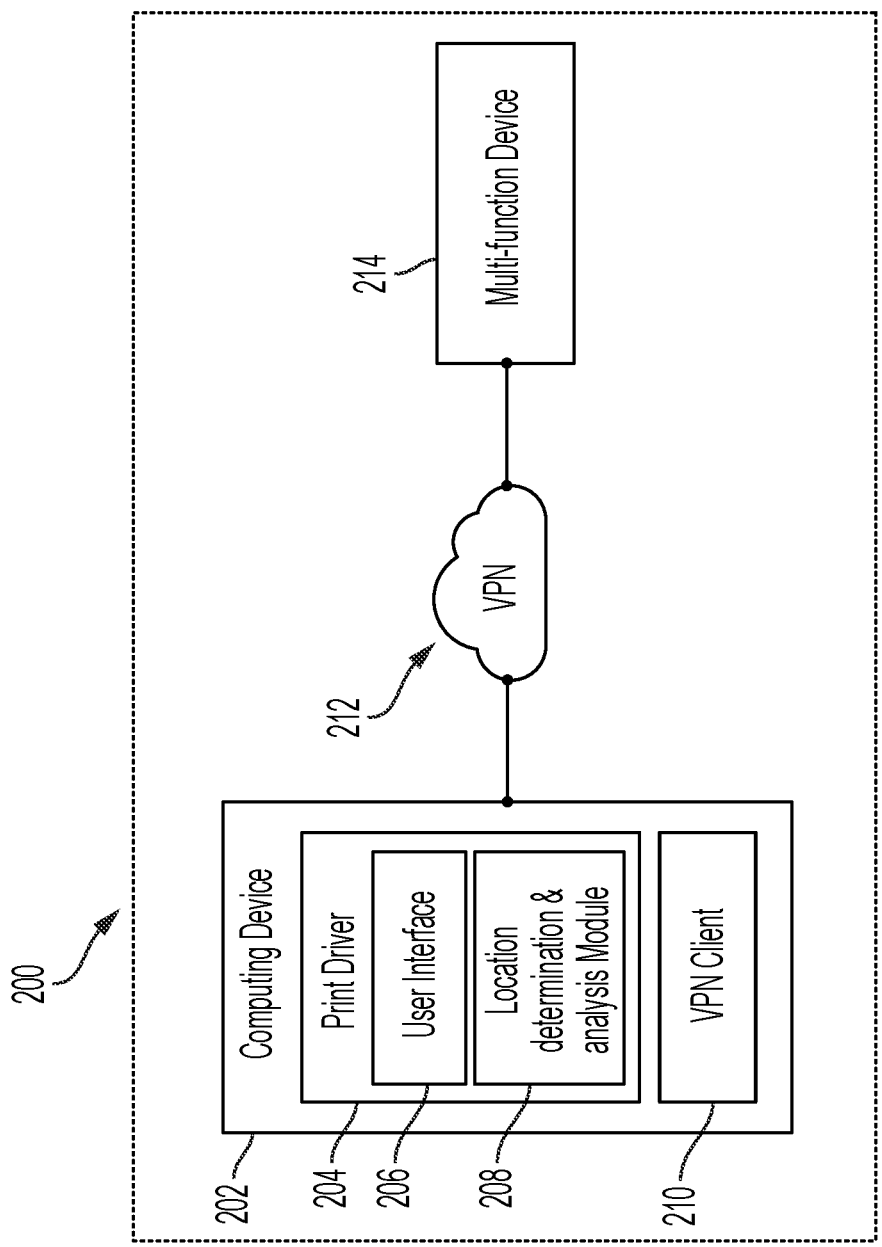
FIG. 2A is a system for securing a remote job, in accordance with an embodiment of the present disclosure.

FIG. 2A is a system 200 including a computing device 202 communicatively coupled to a multi-function device 214 via a virtual private network (VPN) 212. As illustrated, the computing device 202 includes a VPN client 210 and a print driver 204 including a user interface 206 and a location determination and analysis module 208.

A user first connects the computing device 202 to a public network, i.e., the Internet using any methods such as broadband, mobile hotspot, or other known or later developed ways. Once connected, the user opens and accesses the VPN client 210 on his computing device 202, requires to inputs his login credentials such as username, password, employee code, employee id, or other credentials to connect to office network, devices, resources such as printers, multi-function devices (such as 214), or communicate with other users. This establishes a secure connection between the computing device 202 and the multi-function device 214. Once connected to the VPN network 212, the user can see and further access any resource, file, or communicate with any other users like he performs when connected in a location area network. For example, the user can access a file present on a file server and so on.

In operation, the user uses the print driver 204 to submit a document for printing to a multi-function device 214 that is located remotely from the user's computing device 202. The user submits a print command request for printing a document along with selection of one or more print attributes as discussed above. While submitting the print command, the user can see all multi-function devices available for printing and can select any multi-function device. For example, the user can select a multi-function device such as 214 for printing. The print driver 204 receives the document along with the selected multi-function device 214 for printing. Before submitting the document for printing to the selected multi-function device 214, the print driver 204 checks whether the computing device 202 is remotely located or not. To this end, the print driver 204 communicates with the location determination and analysis module 208. The location determination and analysis module 208 obtains the location of the computing device 202 in real-time using GPS, for example. The location determination and analysis module 208 may obtain the location of the computing device 202 based on an IP (Internet Protocol) address of the computing device 202. In other examples, location determination and analysis module 208 may obtain the location of the computing device 202 using any third party services or tools as known or later developed ways. Once obtained, the location determination and analysis module 208 compares the location of the computing device 202 with a location of the multi-function device 214 which is selected for printing the document. To this end, the location of the selected multi-function device 214 may be obtained through the print driver 204 itself or may be obtained if the IP address of the selected multi-function device 214 is known or pre-fed in the print driver 204. Further, the location of the selected multi-function device 214 may be obtained by establishing a connection between the print driver 20 and the selected multi-function device 214.

Once the location of both—the print driver 204 and the selected multi-function device 214 is obtained, the location determination & analysis module 208 compares the location of the computing device 202 with the location of the selected multi-function device 214. The location determination and analysis module 208 then calculates a distance between the computing device 202 and the selected multi-function device 214 and further determines if the distance between the computing device 202 and the selected multi-function device 214 is greater than a pre-defined value. The pre-defined value may be 15 km as one example. For example, if the distance between the computing device 202 and the multi-function device 214 is greater than 15 km, the location determination and analysis module 208 determines that the computing device 202 is not a part of local area network and is away from the office location. The location determination and analysis module 208 may simply compare the location of the computing device 202 with the location of the selected multi-function device 214 and determines that the computing device 202 is located remotely from the office or from the multi-function device 214. In some implementations, the location determination and analysis module 208 may obtain an area range which is defined in the multi-function device 214. For example, if the area range defined is 25 kms and the location determination and analysis module 208 further identifies whether the distance between the computing device 202 and the multi-function device 214 is greater than the defined area range. If greater, the location determination and analysis module 208 considers that the computing device 202 is located remotely from the multi-function device 214. Otherwise, the computing device 202 is located near the multi-function device 214. This way, the location determination and analysis module 208 determines that the computing device 202 is located remotely from the multi-function device 214. The pre-defined value and the defined area range (such as distance) indicates a boundary within which all devices are considered as local devices and devices that fall outside the boundary are considered as remotely located.

Figure 3A:
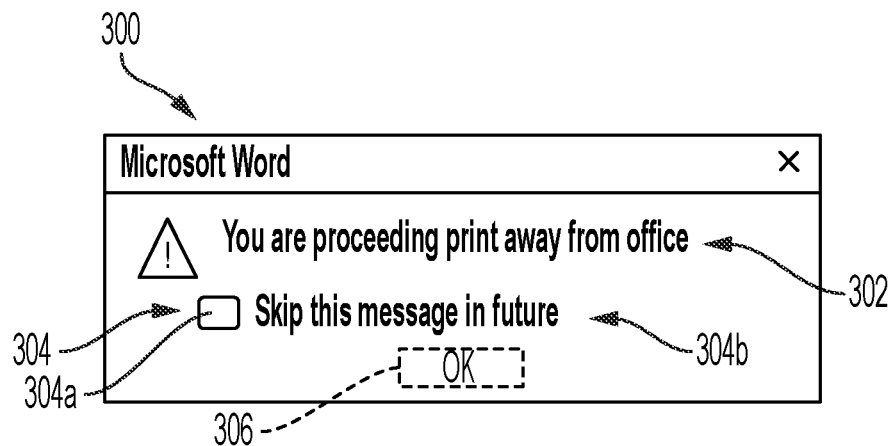
FIGS. 3A, 3B, 3C and 3D are exemplary snapshots of various messages/alerts displayed to users.
Figure 3B:
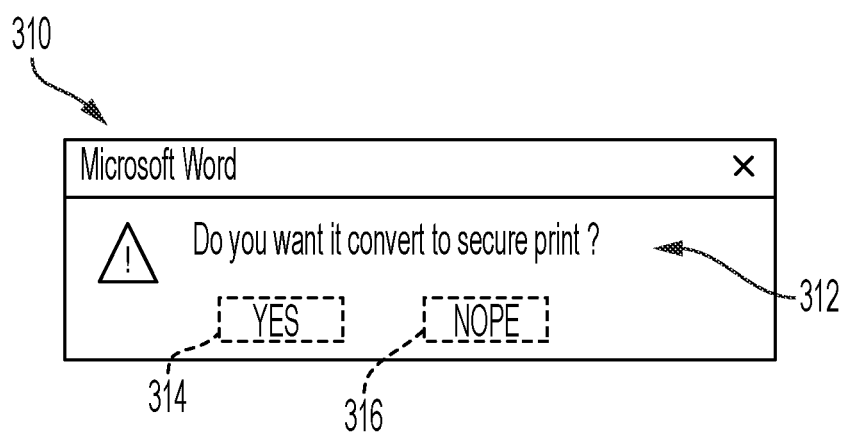

The location determination and analysis module 208 then communicates it to the print driver 204. The print driver 204 checks the print attributes and identifies if the user has submitted the document as a normal print job or a secure print job. If the print attribute is normal print job, then the print driver 204 generates a message for the user indicating that the computing device 202 is away from the office. The message is generated in the form of an alert and displayed to the user via the print driver user interface 206 itself. The message is presented to the user to submit the normal print job as a secure print job. One such exemplary user interface 300 is shown in FIG. 3A. The user interface 300 for example displays a pre-defined message such as "you are proceeding print away from office" (marked as 302). The user can select an option Ok (marked as 306) to proceed further. The user interface 300 additionally shows a message to the user to skip the message (marked as 304*b*) for future. The user can opt to skip such messages using a checkbox marked as 304*a*, the message 304*b* and the checkbox 304*a* collectively as 304.

Based on the response from the user, the print driver 204 automatically converts the normal print job to the secure print job. Here, the print driver 204 changes at least one print attribute such as a normal print job to a secure print job. This way, the print driver 204 secures print job submitted from a remote location and enhances a level of security to the remote working environment. In some implementations, the print driver 204 provides an option to the user to convert the normal print job to a secure print job in real-time. The option is provided through the user interface 206. Once such exemplary interface 310 with an option (marked as 312) is shown to the user. The option 312 asks whether the user wants to convert it to a secure print job. If the user selects Yes (marked as 314), the print driver 204 converts the normal print job to the secure print job. If the user selects No (marked as 316), the print driver 204 keeps the normal print job as is.

Upon successfully changing the normal print job to the secure print job, the print driver 204 submits the document, and print attributes to the multi-function device 214 for printing. The secure print job can be printed when the user is present at the multi-function device 214 and further inputs his authentication information such as username, user id, password, employee id or the like. Upon successful authentication of the user, the multi-function device 214 prints the document based on the print attributes as submitted by the user. This way, the system 200 provides a way to secure a remote print job i.e., a job when submitted from the computing device 202 which is located remotely from the multi-function device 214/office.

Figure 2B:
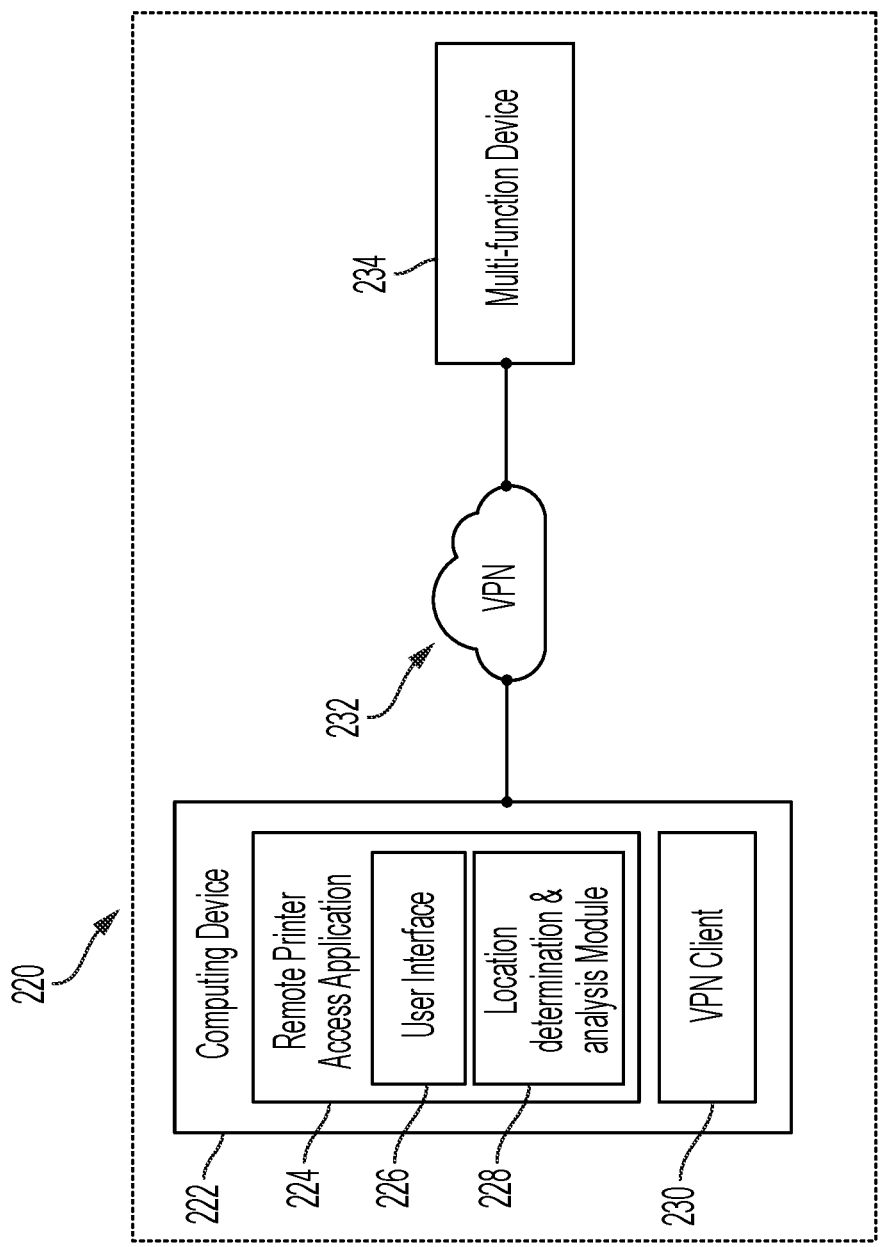
FIG. 2B is another system for managing one or more office devices, in accordance with an embodiment of the present disclosure.

FIG. 2B shows a system 220 with a computing device 222 and a multi-function device 234, the system 220 is similar to the system 200 as shown and discussed in FIG. 2A. However, the request submitted from the computing device 222 is different from the request submitted in FIGS. 1A and 2A. As per FIG. 2B, the computing device 222 includes a remote printer access application 224 that allows a user such as an admin user to manage any office devices remotely.

The admin user first connects the computing device 222 to a public network, i.e., the Internet using any methods such as broadband, mobile hotspot, or other known or later developed ways. Once connected, the admin user opens and accesses the VPN client 230 on his computing device 222, requires inputting his login credentials such as username, password, employee code, employee id, or other credentials to connect to office network, devices, resources such as printers, multi-function devices, or communicate with other users. This establishes a secure connection between the computing device 222 and the multi-function device 234. Once connected to the VPN network 232, the admin user further uses the remote printer access application 224 to access and manage any office device, resource, file, or communicate with any other users like he performs when connected in a location area network. For example, the admin user can access the multi-function device 234 and remotely manage the multi-function device 234.

In implementation, the admin user submits a request to turn-off a multi-function device such as 234. The request is submitted through the user interface 226 of the remote printer access application 224. The user interface 226 further includes various options for the admin user as discussed below in detail. Before turning-off the multi-function device 234, the remote printer access application 224 checks whether the computing device 222 of the admin user is connected remotely to the multi-function device 234. To this end, the remote printer access application 224 communicates with the location determination and analysis 228 module. The location determination and analysis module 228 obtains the location of the computing device 222 using GPS, for example in real-time. The location determination and analysis module 228 may obtain the location of the computing device 222 based on IP address of the computing device 222. In other examples, the location determination and analysis module 228 may obtain the location of the computing device 222 using any third party services or tools as known or later developed ways. The location determination and analysis module 228 further compares the location of the computing device 222 with a location of the selected multi-function device 234. The location of the selected multi-function device 234 may be obtained through the remote printer access application 224 or may be obtained if the IP address of the selected multi-function device 234 is known or pre-fed in the remote printer access application 224. Further, the location of the selected multi-function device 234 may be obtained by establishing a communication with the selected multi-function device 234. Once the location of the selected multi-function device 234 is obtained, the location determination & analysis module 228 compares the location of the computing device 222 with the location of the selected multi-function device 234. The location determination and analysis module 228 calculates a distance between the computing device 222 and the selected multi-function device 234 and further determines if the distance between the computing device 222 is greater than a pre-defined value. For example, if the distance between the computing device 222 and the multi-function device 234 is greater than 15 km, the location determination and analysis module 228 determines that the computing device 222 is not a part of local area network and is away from office location i.e., located remotely. The location determination and analysis module 228 may simply compare the location of the computing device 222 with the location of the selected multi-function device 234 and may determine that the computing device 222 is located remotely from the office. The location determination and analysis module 228 then communicates it to the remote printer access application 224. The remote printer access application 224 generates a message for the admin user indicating that the computing device 222 is away from the office. The message is generated in the form of an alert or a warning message and is displayed to the admin user via the remote printer access application 224. The alert reminds the admin user that he is working from remote location and is not required to turn-off or pause the device 234.

Although the remote printer access application 224 is shown to include modules such as 226 and 228 but the functionalities of these modules 226 and 228 can be directly incorporated in the remote printer access application 224. In such cases, the location determination, location comparison, generation of alert, message etc. is performed by the application 224.

The remote printer access application 224 lists all multi-function devices available in the office premise. The admin user may select any multi-function device from the list of multi-function devices. For the sake of discussion, it is considered that the admin user selects a single multi-function device such as 234.

Figure 3C:
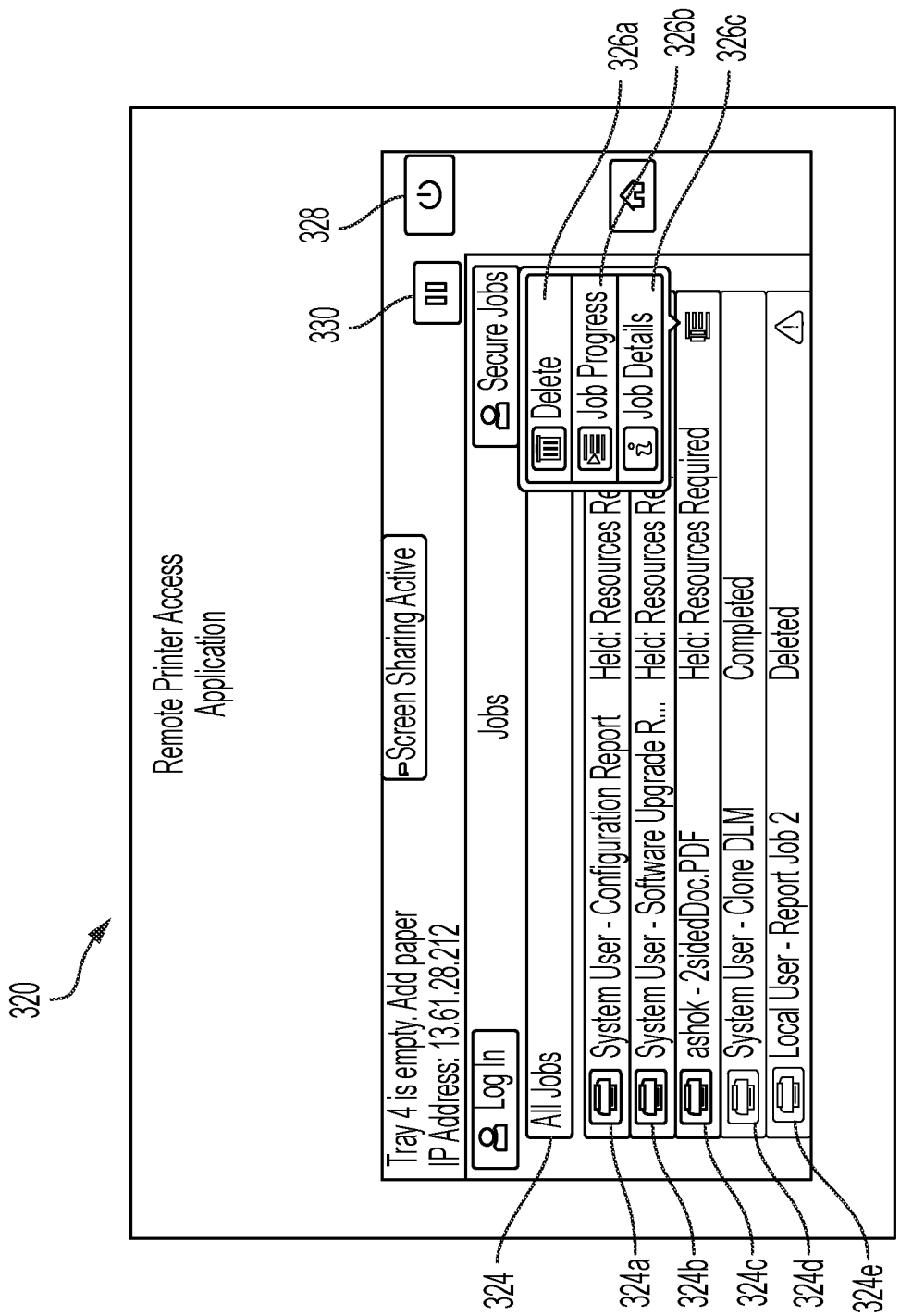
Figure 3D:
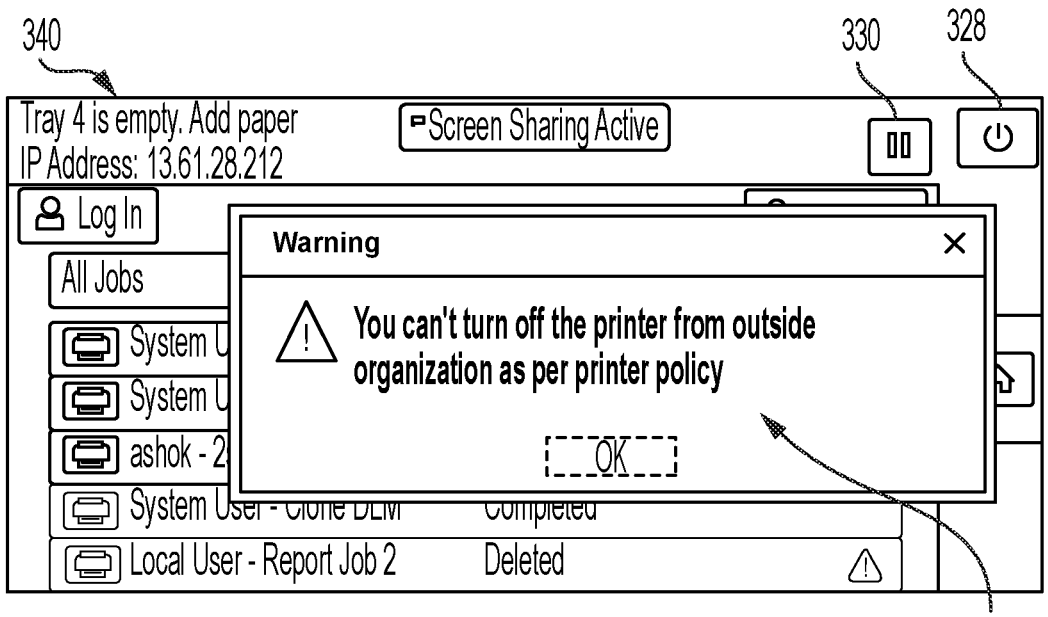
Figure 3E:
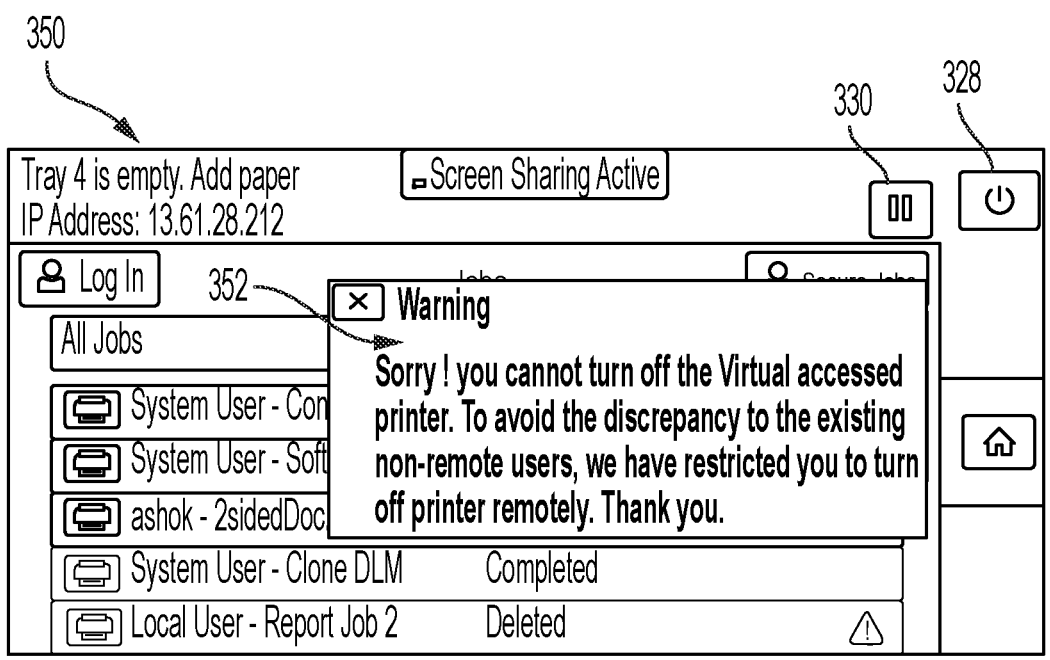
FIG. 3E shows another exemplary snapshot of a message/alert displayed to users.

One such exemplary remote printer access application such as 320 is shown FIG. 3C. As shown, the remote printer access application 320 or its user interface displays all jobs (marked as 324) submitted by various users such as 324*a*, 324*b*, 324*c*, 324*d* and 324*e*. As further shown, the remote printer access application 320 includes various options such as delete 326*a*, job progress 326*b*, and job details 326*c* (collectively 326). The option 326*a* allows the admin user to delete any jobs, the option 326*b* allows the admin user to see progress of any listed jobs, the option 326*c* allows the admin user to view any details of the listed jobs in the job queue. The application 320 further includes a turn-off option marked as 328 to turn-off an office device such as 234 and includes a pause option marked as 330 to pause the device 234 temporarily. When the admin user selects the turn-off option 328, an exemplary message is displayed to the admin user as shown in FIG. 3D. The exemplary message is—"you can't turn off the printer from outside organization as per printer policy" (marked as 342) in the snapshot 340 of FIG. 3D. Another exemplary message shown to the admin user is "Sorry. You cant turn off the virtual accessed printer, to avoid the discrepancy to the existing non-remote users, we have restricted you to turn off the printer remotely" (marked as 352), in the snapshot 350 of FIG. 3E.

Although FIGS. 2A and 2B are discussed with respect to the print driver 204 and the remote printer access application 224, where the location identification and distance calculation is performed by the location determination and analysis module 208 and 228 respectively. But it is understood that the location identification (of both, the computing devices 202, 222 and the multi-function devices 214, 234) and distance calculation can be performed at VPN level for example, by i.e., VPN clients 210 and 230 as shown in FIGS. 2A and 2B, respectively. For example, the VPN client 210 may already have source and destination locations, i.e., the computing device 202 and the multi-function device 214 locations and based on these locations, the VPN client 210 calculates the distance and identifies whether the computing device 202 is located remotely or not. In other examples, the VPN client 210 may obtain the location of the multi-function device 214 in real-time. Similarly, the VPN client 230 of FIG. 2B may already have source location, i.e., the computing device 222 and destination location i.e., the multi-function device 234 and based on these locations, the VPN client 230 calculates the distance and identifies whether the computing device 222 is located remotely or not. In other example, the VPN client 230 may obtain the location of the multi-function device 234 in real-time. These are few examples, but any known methods or later developed methods can be used to determine/identify the location of the computing devices (202 and 222) and the multi-function devices (214 and 234) without deviating the scope of the disclosure.

Exemplary Method Flowcharts

Figure 4:
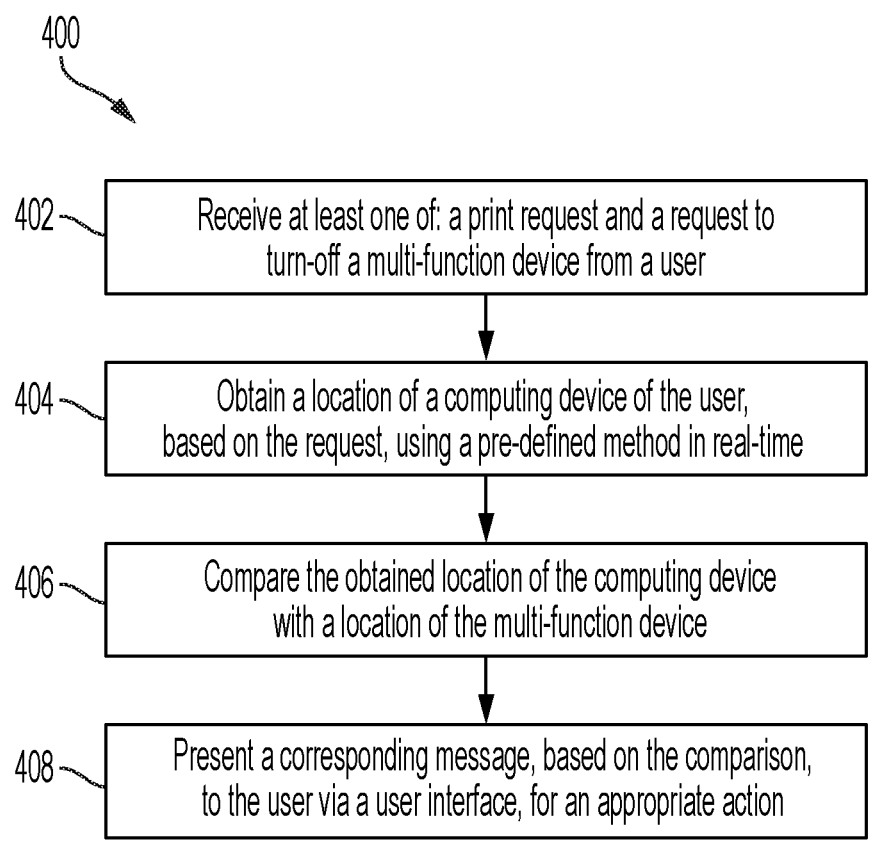
FIG. 4 is an exemplary method flowchart for handling one or more requests received from one or more users in a remote working environment.

FIG. 4 is a method flowchart 400 for controlling one or more requests received in a remote working environment. At 402, at least one request from a user or a computing device is received. The request may be a print request or a request to turn-off an office device such as a multi-function device 106. The print request includes a print command request for printing a document along with one or more print attributes, where at least one attribute is a destination printing device such as 106. For the sake of easy discussion, it can be considered that the print request or the request to turn-off the multi-function device 106 is received from the same computing device such as 102. But it is understood that the print request or the request to turn-off the device 106 can be received from different computing devices, accordingly, the location of those computing devices is determined and compared. Similarly, the print request or the request to turn-off the device 106 is discussed with respect to the same multi-function device 106. But it is understood that the print request and the request to turn-off the device may be for different multi-function devices. Accordingly, the location of those multi-function devices is considered for comparison. The print request may be received from any users of the office or from an admin user. The request to turn-off the device 106 may be received from the admin user.

Based on the request, it is checked whether the computing device is located remotely by obtaining a location of the computing device using a pre-defined method in real-time, at 404. The location of the computing device is obtained as discussed above in detail. At 406, the obtained location of the computing device is compared with a location of the multi-function device. Based on the comparison, a corresponding message is presented to the user via a user interface, for an appropriate action at 408. For example, if the request from the user relates to the print request, a message is displayed to the user in real-time via a user interface, to submit the document as a secure print job. In another example, if the request from the user relates to turn-off the multi-function device, a warning message is presented to the user via the user interface to not turn-off the multi-function device. This way, the method 400 controls or handles all requests received in the remote working environment. For example, the method 400 controls the print request by first presenting a message to the user to submit the document as a secure print job and/or further converts the document from a normal print job to a secure print job, in order to secure the job as the user/the computing device is away from the office. In another example, the method 400 controls the request to turn-off the multi-function device by first warning the admin user to not turn-off the multi-function device and/or further disallows the admin user to not turn-off the multi-function device.

Figure 5:
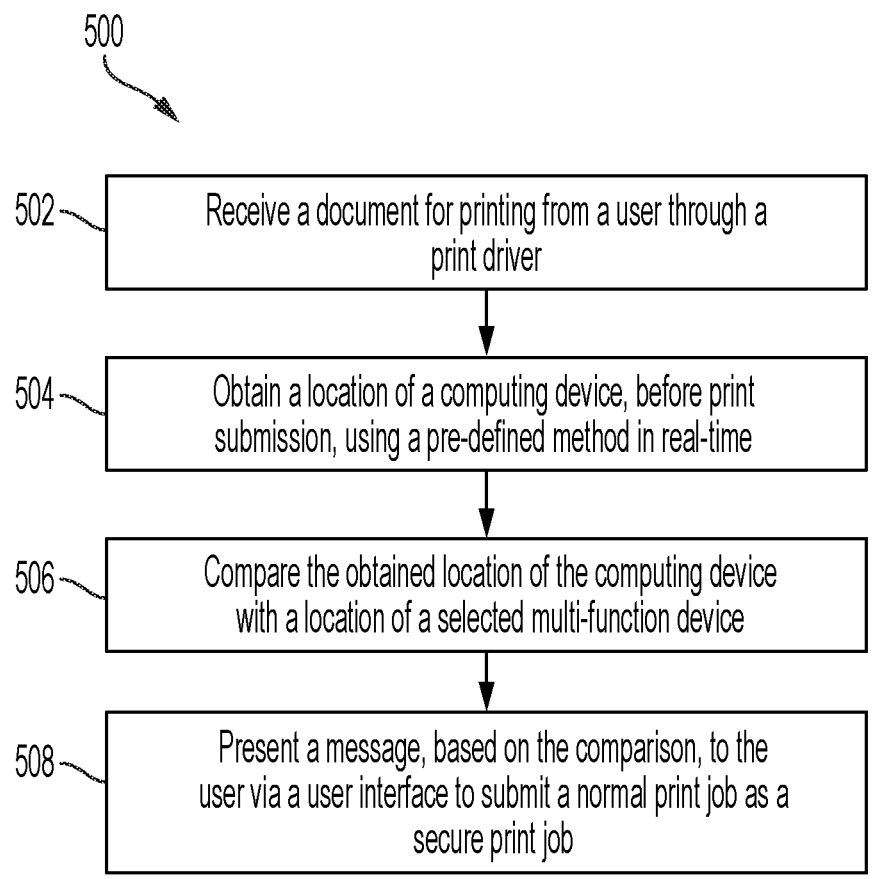
FIG. 5 is an exemplary method flowchart for securing a remote print job, in accordance with an embodiment of the present disclosure.

FIG. 5 is an exemplary method flowchart 500 for securing a remote print job. The method 500 may be implemented at a computing device such as the computing device 102 of FIG. 1A, or the computing device 202 of FIG. 2A. However, the method 500 can be implemented at any equivalent device including a print driver, and so on.

Initially, a user submits a print command through a print driver 104 and selects one or more print attributes as discussed above. Along with this, the printer driver 104 displays one or more multi-function devices available for printing his job. The user selects a multi-function device such as 106 for printing through the print driver. At 502, a document for printing from the user is received along with the print attributes and a selection of the multi-function device 106 for printing.

Before submitting the document for printing to the selected multi-function device 106, a location of the computing device 102 is obtained in real-time at 504. The location is obtained using a pre-defined method such as GPS in real-time. Similar to this, the location of the selected multi-function device 106 is obtained/already known to the computing device 102 or the print driver 104. Then at 506, the obtained location of the computing device 102 is compared with the location of the selected multi-function device 106. Then, distance between the computing device 102 and the selected multi-function device 106 is calculated based on their obtained locations. If the calculated distance difference in the compared location is greater than a pre-defined value for example 10 KM, then it is determined the computing device 102 is located outside the office or remotely located. Accordingly, at 508, a notification/message is generated for the user to submit the print job as a secure job and is displayed/presented to the user. The notification alerts and reminds the user that he is operating outside the office premise and hence requires to submit the document as a secure print job as the user is not in office. Based on the response from the user, the normal print job is directly and automatically converted from a normal print to the secure print job. In some cases, the user is provided an option to convert the normal print job to the secure print job. The user can select the option and manually change the print attribute from a normal print job to a secure print job. This way, the method 500 secures the print job submitted from a remote location and ensures the document submitted from the computing device 102 is a secure print job.

For the purpose of the method 500, it is considered that the print request includes a document, where print type attribute selected for the document is a normal print job.

Figure 6:
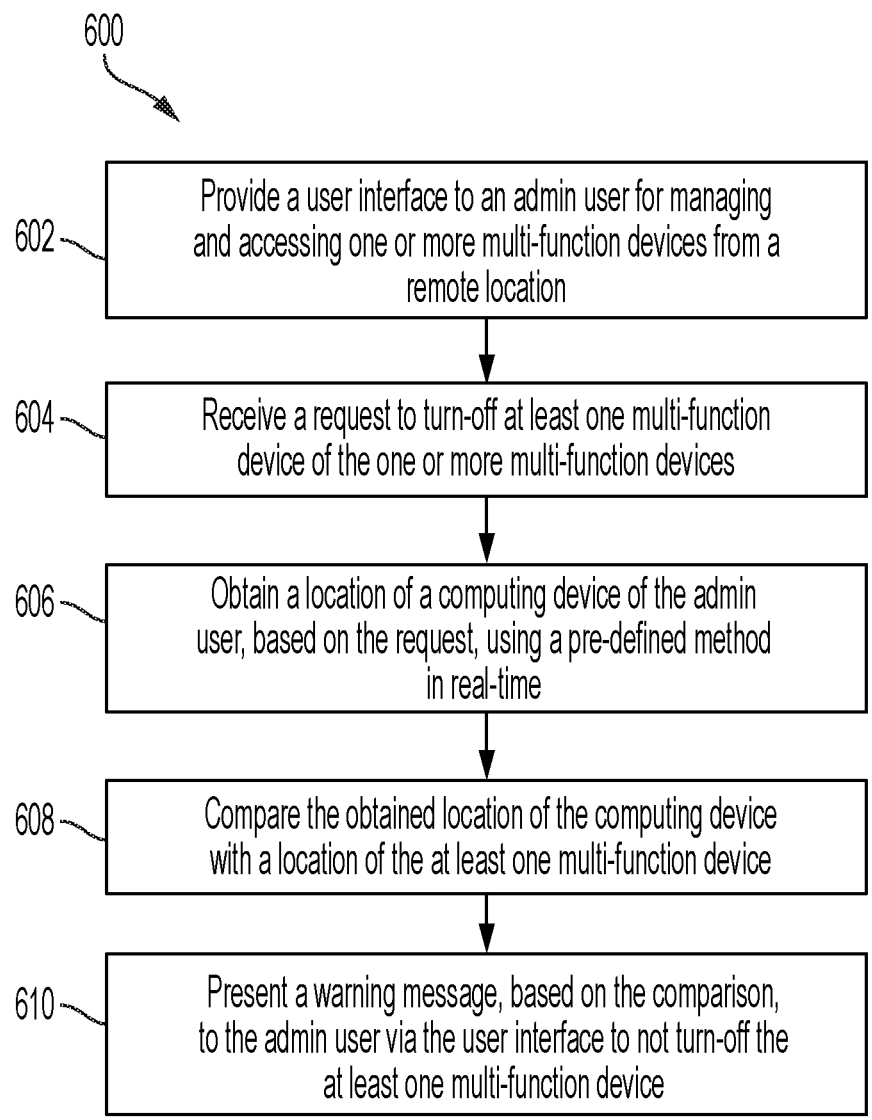
FIG. 6 is an exemplary method flowchart for managing one or more multi-function devices from a remote location, in accordance with an embodiment of the present disclosure.

FIG. 6 is an exemplary method flowchart 600 for managing one or more multi-function devices from a remote location. The method 600 may be implemented at a computing device, such as the computing device 112 of FIG. 1B, or the computing device 222 of FIG. 2B. However, the method 600 can be implemented at any equivalent device including a remote printer access application, and so on.

A remote printer access application 114 runs on a computing device 112 of the admin user that allows him to manage one or more office devices from a remote location. For example, the admin user can access the multi-function device 116. Here, all multi-function devices are present in the office premise.

At 602, a user interface is provided to the admin user for managing and accessing one or more multi-function devices from a remote location. Here, the one or more multi-function devices are communicatively coupled to each other via a local area network. For simplicity, a single multi-function device such as 116 is considered for discussing the flowchart 600.

At block 604, a request to turn-off at least one multi-function device such as 116 of the one or more multi-function devices is received. The admin user selects the at least multi-function device 116 and then selects an option included in the remote printer access application to turn-off the device 116.

Based on the request and before turning-off the selected multi-function device, at block 606, a location of the computing device 112 is obtained in real-time. The location is obtained using a pre-defined method such as GPS in real-time. Similar to this, the location of the selected multi-function device 116 is obtained/already known. Then at 608, the obtained location of the computing device 112 is compared with the location of the selected multi-function device 116. Then, distance between the computing device 112 and multi-function device 116 is calculated based on their obtained locations. If the calculated difference in the compared location is greater than a pre-defined value i.e., 10 KM, then it is determined the computing device 112 is located outside the office or remotely located.

Then at 610, a warning message is displayed to the admin user via a user interface, if the difference is the compared location is more than a pre-defined value. The warning message may be to not turn-off the at least one multi-function device 116. In some cases, the admin user is restricted to turn-off the selected multi-function device 116 by disabling the turn-off option included in the remote printer access application 114. Alternatively, the admin user is disallowed to turn-off the multi-function device 116. In other cases, the turn-off option is temporarily disabled for the admin user. This way, the method 600 manages the multi-function devices remotely and ensures that other users who may be present in the office premise can continue to use the multi-function device 116.

The method 600 is discussed with respect to a scenario where the admin user requests to turn-off a single multi-function device but the method 600 can be implemented when the admin user requests to turn-off multiple multi-function devices. In such cases, the location of each multi-function device is obtained and then compared with the location of the computing device of the admin user. Based on the comparison, the admin user is presented with a message for an appropriate action for each multi-function device. For example, the admin user may not turn-off the multi-function device 116. And the admin user may be further restricted or disallowed to turn-off the multi-function device.

Although the method 600 is discussed with respect to turn-off request but the method 600 can be implemented when the admin user requests to pause the device 116.

Figure 7:
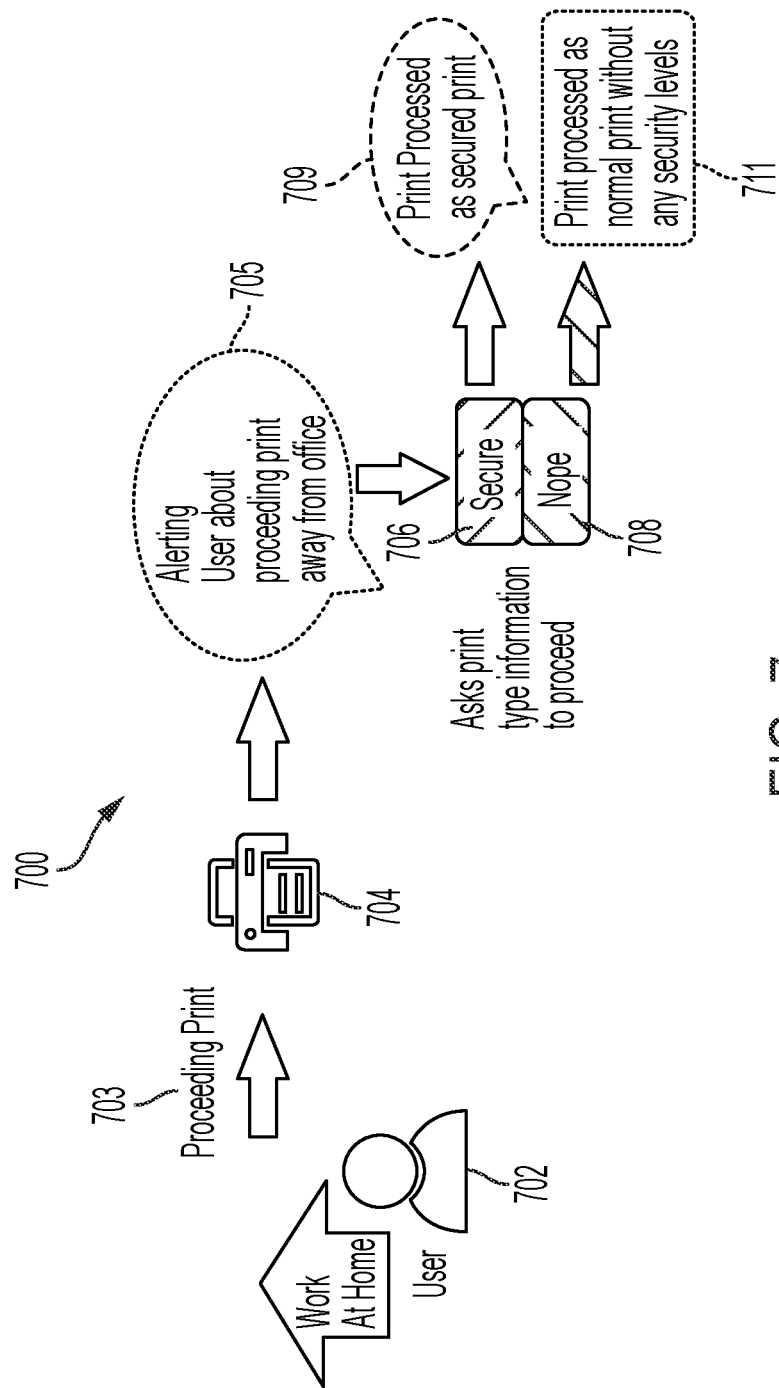
FIG. 7 shows an exemplary flow diagram for implementing the present disclosure.

FIG. 7 shows a flow diagram 700, where a user 702 operates from a remote location (such as home) uses a computing device and selects a document for printing and further selects the printer such as 704 for printing. This way, the user 702 proceeds with printing (marked as 703). Before submitting the document to the printer 704, the user is alerted about printing away from a remote location (marked as 705). Then, the user is asked to select print type information to proceed such as secure print job (marked as 706) or normal print job (708). If the user selects the secure print job option 706, the print is processed as a secure print job (marked as 709). If the user selects the option 708, the print job is processed as a normal print job (marked as 711).

Exemplary Office Environment

Figure 8:
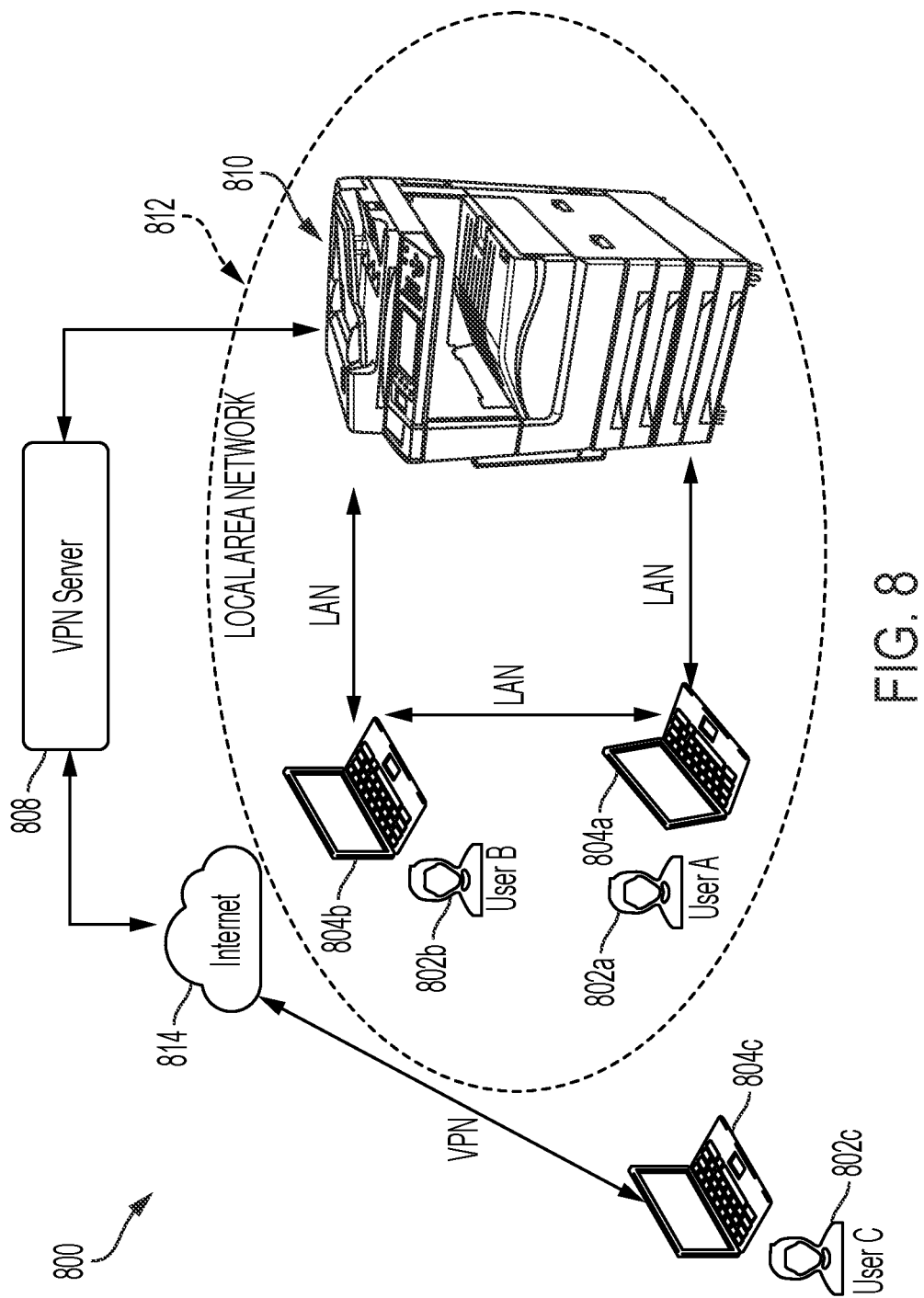
FIG. 8 shows an exemplary office environment for implementing the present disclosure.

An exemplary use case scenario for implementing the current disclosure is discussed in conjunction with FIG. 8. But it is understood that the disclosure can be implemented for other case scenarios without limiting its scope.

FIG. 8 represents an exemplary office environment 800 showing multiple users such as users 802a, 802b, 802c (collectively 802), multiple computing devices 804a, 804b, and 804c (collectively 804) and a multi-function device 810. The user 802a uses the computing device 804a, the user 802b uses the computing device 804b and the user 802c uses the computing device 804c for their day-to-day work and so on. As clearly indicated, some users such as 802a, 802b operate from office and are connected to each other via a local area network (LAN), whereas a user 802c operate from a remote location i.e., outside office and is connected to the office network via VPN server 808 through the Internet 814. As shown, users 802a and 802b, and computing devices 804a and 804b that are a part of the LAN is indicated by a boundary (marked as 812). Further, the user such as 802c and the computing device 804c that are located remotely are shown outside the boundary 812.

Typically, when the users 802a and 802b submit a print request to the multi-function device 810, the print driver running on respective computing devices 804a and 804b of the users 802a and 802b identifies that the computing devices 804a and 804b are a part of the LAN. The print driver of the computing devices 804a and 804b submit respective documents of the users 802a and 802b to the multi-function device 810 for printing. The multi-function device 810 prints the document and the users 802a and 802b gather their respective printed document. But when the user 802c submits a print request including a document, the print driver running on the computing device 804c checks whether the computing device 804c is a part of local area network or is located remotely. Based on the check, the print driver identifies that the computing device 804c is located remotely, the print driver presents a message to the user 802c to submit the document/print job as a secure print job when outside the office.

If the user 802c is an admin user and tries to turn-off the multi-function device 810, the remote printer access application running on the computing device 804c first checks whether the computing device 804c or admin user is remotely located or a part of the local area network. Based on the check, the remote printing application identifies that the computing device 804c is located remotely. The application then restricts the user 802c to turn-off the multi-function device 810. This way, other users 802a and 802b present in the office premise can continue to use or access the multi-function device 810 without any hindrance.

The requests received in a remote working environment can be controlled by automatically converting the normal print job to a secure print job or by providing an option to the user to change the normal print job to a secure print job. Similarly, the request to turn-off an office device can be controlled by disabling the turn-off option, restricting the admin user, or by disallowing the admin user to turn-off the device.

The present disclosure can be implemented for any organization where some users operate from office location and some users operate from a remote location. The present disclosure can be implemented for any organization where all users may operate from a remote location. i.e., any location away from the office location.

The present disclosure discloses methods and systems for handling user's request in a remote working environment such as print request or a request to turn-off an office device such as a printer. The methods and systems generate required alert/notification when a user submits a normal print from a remote location and further converts the normal print job into a secure print job based on user's input before print submission. As a result, the methods and systems solve security problems when submitting print jobs from a remote location i.e., outside from an office. The methods and systems provide a user friendly approach and an efficient way of securing remote prints. Similarly, the methods and systems generate an alert/notification for an admin user when he tries to turn-off an office device from a remote location and further disallows the admin the user for turning-off the device. The methods and systems automatically add security to a common function and further add a layer of security for remote users. The methods and systems bring awareness on print proceeding away from office or on turning-off request away from office.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, printing, controlling, handling, generating, presenting, displaying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for securing a remote print, the method being implemented at a print driver running on a computing device, the method comprising:
    receiving a print command request for printing a document from a user through the print driver along with one or more print attributes, wherein at least one print attribute selected for printing the document is a normal print job;
    before submitting the document for printing to a multi-function device, checking whether the computing device is located remotely to the multi-function device; and
    based on the check, providing an option to the user via a user interface, to convert the document submitted as the normal print job to a secure print job in real-time.

2. The method of claim 1, wherein checking further comprises obtaining a location of the computing device using a pre-defined method in real-time.

3. The method of claim 2, further comprising, comparing the obtained location of the computing device with a location of the multi-function device.

4. The method of claim 1, further comprising, obtaining the location of the multi-function device.

5. The method of claim 1, further comprising, displaying the message to the user via the user interface, if the difference in the compared location is more than a pre-defined value.

6. The method of claim 1, further comprising, automatically converting document submitted as a normal print job to a secure print job by changing the one or more print attributes associated with the document.

7. A computing device for securing a remote print job, comprising a print driver, for:
    receiving a print request for printing a document through the print driver along with one or more print attributes, wherein at least one print attribute selected for printing the document is a normal print job;
    before submitting the document for printing to a multi-function device, checking whether the computing device is located remotely to the multi-function device; and
    based on the check, providing an option via a user interface, to convert the document submitted as the normal print job to a secure print job in real-time.

8. The computing device of claim 7, wherein the print driver is for obtaining a location of the computing device using a pre-defined method in real-time.

9. The computing device of claim 8, wherein the print driver is for, comparing the obtained location of the computing device with a location of the multi-function device.

10. The computing device of claim 8, wherein the print driver is for displaying the alert to the user if the difference in the compared location is more than a pre-defined value.

11. The computing device of claim 7, wherein the print driver is for automatically converting the document submitted as a normal print job to a secure print job by changing the at least one print attribute.

12. A method for managing one or more multi-function devices from a remote location, comprising:
    a remote printer access app running on a computing device of an admin user for:
        providing a user interface to the admin user for managing and accessing the one or more multi-function devices and one or more print jobs from a remote location, wherein the one or more multi-function devices are communicatively coupled to each other via a network;
        receiving a request to turn-off at least one multi-function device of the one or more multi-function devices connected in the network;
        based on the request, checking whether the computing device is remotely located to the multi-function device by obtaining a location of the computing device using a pre-defined method in real-time;
        comparing the obtained location of the computing device with a location of the at least one multi-function device; and
        based on the comparison, presenting a warning message to the admin user via the user interface to not turn-off the at least one multi-function device.

13. The method of claim 12, further comprising, disallowing the admin user to turn-off the at least one multi-function device if the difference in the compared location is more than a pre-defined value.

14. The method of claim 12, further comprising, presenting the warning message to the user if the difference in the compared location is more than a pre-defined value.

15. A computing device for managing one or more multi-function devices from a remote location, comprising:
    a remote printer access app running on the computing device of an admin user for:
        providing a user interface to the admin user for managing and accessing one or more multi-function devices and one or more print jobs from a remote location, wherein the one or more multi-function devices are communicatively coupled to each other via a network;
        receiving a request to turn-off at least one multi-function device of the one or more multi-function devices;
        based on the request, obtaining a location of the computing device of the admin user using a pre-defined method in real-time;
        comparing the obtained location of the computing device with a location of the at least one multi-function device; and
        based on the comparison, presenting a warning message to the admin user via the user interface to not turn-off the at least one multi-function device.

16. The computing device of claim 15, wherein the remote printer access app is for disallowing the admin user to turn-off the at least one multi-function device if the difference in the compared location is more than a pre-defined value.

17. The computing device of claim 15, wherein the remote printer access app is for presenting the warning message to the user if the difference in the compared location is more than a pre-defined value.

18. A method for controlling one or more requests received in a remote working environment, the method comprising:
    receiving at least one request comprising a print request and a request to turn-off a multi-function device from a computing device of a user;
    based on the request, checking whether the computing device is located remotely by obtaining a location of the computing device using a pre-defined method in real-time;
    comparing the obtained location of the computing device with a location of the multi-function device; and based on the comparison, presenting an alert to the user via a user interface, for an appropriate action.

19. The method of claim 18, further comprising, if the request from the user relates to a print request, presenting an alert message to the user via a user interface, to submit a document for printing as a secure print job in real-time.

20. The method of claim 18, further comprising, if the request from the user relates to turn-off a multi-function device, presenting a warning message to the user via the user interface to not turn-off the multi-function device.

* * * * *